UNITED STATES PATENT OFFICE.

ERNST WILLY FRIEDRICH, OF BLATON, BELGIUM.

MANUFACTURING ARTIFICIAL THREADS, FILMS, AND THE LIKE.

No. 850,571.     Specification of Letters Patent.     Patented April 16, 1907.

Application filed December 10, 1906. Serial No. 347,029.

*To all whom it may concern:*

Be it known that I, ERNST WILLY FRIEDRICH, a subject of the German Emperor, and a resident of Blaton, in the Kingdom of Belgium, have invented new and useful Improvements in the Process of Manufacturing Artificial Threads, Films, and the Like, of which the following is a full, clear, and exact specification.

The present invention relates to a process for the manufacture of artificial threads, films, or the like, in which the proportion of ammonia used for making the necessary solution of cellulose or the like may be essentially less than that which has hitherto generally been required.

By the procedure which has hitherto been usual in making such solutions it was necessary, in order to avoid premature coagulation, to use a certain proportion of ammonia in excess, so that the solution might have the required content of cellulose. It is true that after neutralization this excess of ammonia could be recovered, but of course during the operations for effecting this there was an unavoidable loss, and, moreover, the neutralizing agent was sacrificed. It was not possible first to prepare a concentrated solution of cellulose, which of itself alone presents technical difficulties, and then to dilute this solution by adding water until it contained the desired proportion of cellulose, because in doing so the cellulose was very easily separated from the solution.

The attempt has been made to separate a part of the ammonia from the solution—for instance, by using a vacuum. This, however, is a tedious operation and may easily entail a loss of part of the ammonia.

By the present invention a solution containing the same proportion of cellulose as such solutions have hitherto generally contained may be prepared, notwithstanding that an essentially smaller proportion of ammonia is used—for example, only half—in making the solution. For this purpose instead of preparing the whole solution at once there is first prepared a solution of a portion of the cellulose to be dissolved in an ammoniacal solution containing the usual proportion of ammonia for that quantity of cellulose. To the solution thus produced there is then added the rest of the cellulose in separate portions, together with further portions of ammonia, in which portions the concentration of the ammonia decreases.

In order to obtain a solution containing five per cent. of cellulose according to the methods hitherto usual, as much as one liter of the ordinary ammoniacal liquid had to be used for every fifty grams of cellulose. According to the present invention, however, the same quantity of cellulose can be brought into solution with aid of five hundred cubic centimeters of the same ammoniacal liquid, and the bulk may be made up with water.

The following example illustrates the invention: Basic copper sulfate is precipitated upon fifty grams of hydrated cellulose by mixing hydrated cellulose, copper sulfate, and caustic potash in the proportions represented by the formula:

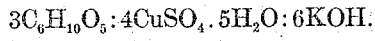

$$3C_6H_{10}O_5 : 4CuSO_4 . 5H_2O : 6KOH.$$

The cellulose thus prepared is divided into four equal portions. Of these one is dissolved in two hundred and fifty cubic centimeters of ammonia solution of specific gravity 18° to 20° Baumé. To the solution thus obtained the other three portions are added little by little, and at the same time there is added in all two hundred and fifty cubic centimeters of the same solution of ammonia distributed between the separate portions of cellulose, the portion of ammonia solution added being more strongly diluted with water for each successive portion of cellulose and the total quantity of water added being sufficient to bring the total volume of the liquid to one liter. It is necessary to observe that the proportion of water to solution of ammonia in the last portion added should be 1:1 to 1:¾, because if a more dilute solution of ammonia were used coagulation might ensue. The solution thus obtained is filtered, for which purpose a metal gauze having one hundred and sixty to one hundred and eighty meshes to the centimeter will suffice. The filtered solution is viscous, permanent, and spins well and can be made into artificial threads, films, or the like in the usual manner.

The proceeding is analogous in starting from one of the other materials serving to produce similar products—for instance, when the raw material is a cellulose of different properties, silk, or the like. The metallic compound used may be introduced in any known manner equally as well as in that described.

What I claim is—

1. The herein-described process of manufacturing artificial glossy products from fibrous substances soluble in ammoniacal solutions of metallic compounds, by first preparing a solution from a part of the substance that is to be dissolved, in presence of such metallic compound, in a solution of ammonia containing the proportion of ammonia usual for that quantity of said substance, and then adding to the solution thus obtained the rest of said substance in several portions together with corresponding quantities of metallic compound and at the same time further portions of ammonia in solutions of successively-diminishing strength, avoiding however precipitating the dissolved substance by an undue excess of water, and finally converting the solution into glossy products by giving the material a convenient form and coagulating the so-called products, substantially as described.

2. The herein-described process of manufacturing artificial threads from fibrous substances soluble in ammoniacal solutions of metallic compounds, by first preparing a solution from a part of the substance that is to be dissolved, in presence of such metallic compound, in a solution of ammonia containing the proportion of ammonia usual for that quantity of said substance, and then adding to the solution thus obtained the rest of said substance in several portions together with corresponding quantities of metallic compound and at the same time further portions of ammonia in solutions of successively-diminishing strength, avoiding however precipitating the dissolved substance by an undue excess of water, and finally converting the solution into threads by spinning the solution in any convenient manner and coagulating the so-formed threads, substantially as described.

3. The herein-described process of manufacturing artificial threads from cellulose, by first preparing a solution from a part of the cellulose that is to be dissolved, in presence of a metallic compound the ammoniacal solution of which is capable of dissolving cellulose, in a solution of ammonia containing the proportion of ammonia usual for that quantity of cellulose, and then adding to the solution thus obtained the rest of the cellulose in several portions together with corresponding quantities of metallic compound and at the same time further portions of ammonia in solutions of successively-diminishing strength, avoiding however precipitating the cellulose by an undue excess of water, and finally converting the solution into threads by spinning the solution in any convenient manner and coagulating the so-formed threads, substantially as described.

4. The herein-described process of manufacturing artificial threads from cellulose, by first preparing a solution from a part of the cellulose that is to be dissolved, in presence of a copper compound the ammoniacal solution of which is capable of dissolving cellulose, in a solution of ammonia containing the proportion of ammonia usual for that quantity of cellulose, and then adding to the solution thus obtained the rest of the cellulose in several portions together with corresponding quantities of copper compound and at the same time further portions of ammonia in solutions of successively-diminishing strength, avoiding however precipitating the cellulose by an undue excess of water, and finally converting the solution into threads by spinning the solution in any convenient manner and coagulating the so-formed threads, substantially as described.

In testimony that I claim the foregoing as my invention I have signed my name in presence of two subscribing witnesses.

ERNST WILLY FRIEDRICH.

Witnesses:
GREGORY PHELAN,
PAUL MAGHY.